(12) United States Patent
Bambara

(10) Patent No.: US 8,627,848 B2
(45) Date of Patent: Jan. 14, 2014

(54) VANE INLET DEVICE

(75) Inventor: Charles J. Bambara, Short Hills, NJ (US)

(73) Assignee: The Chem-Pro Group LLC, Boonton, NJ (US)

( * ) Notice: Subject to any disclaimer, the term of this patent is extended or adjusted under 35 U.S.C. 154(b) by 593 days.

(21) Appl. No.: 12/896,210

(22) Filed: Oct. 1, 2010

(65) Prior Publication Data

US 2012/0080105 A1   Apr. 5, 2012

(51) Int. Cl.
*F16L 41/00* (2006.01)

(52) U.S. Cl.
USPC ............... 137/561 A; 137/1; 55/440; 55/442; 55/446; 366/338

(58) Field of Classification Search
USPC ............ 137/172, 561 A, 101, 1; 95/260, 262; 55/440, 442, 443, 444, 446, 462, 464, 55/DIG. 37; 261/108, 113, 114.1; 366/336–338, 340
See application file for complete search history.

(56) References Cited

U.S. PATENT DOCUMENTS

| 984,279 | A | * | 2/1911 | Leblanc | 55/DIG. 37 |
| 3,958,966 | A | * | 5/1976 | Keller | 55/442 |
| 4,198,220 | A | * | 4/1980 | Keller | 55/442 |
| 4,591,312 | A | | 5/1986 | Wenglarz | |
| 4,601,731 | A | | 7/1986 | Michelson | |
| 4,767,424 | A | | 8/1988 | McEwan | |
| 6,386,520 | B2 | * | 5/2002 | McEwan | 261/114.1 |
| 6,942,720 | B2 | | 9/2005 | Davies et al. | |
| 8,070,141 | B2 | * | 12/2011 | Kooijman et al. | 261/108 |
| 2005/0060970 | A1 | | 3/2005 | Polderman | |
| 2007/0044437 | A1 | | 3/2007 | Larnholm et al. | |
| 2008/0168753 | A1 | | 7/2008 | Christiansen et al. | |

FOREIGN PATENT DOCUMENTS

| WO | 2005018780 A2 | 3/2005 |
| WO | 2005058503 A1 | 6/2005 |

* cited by examiner

*Primary Examiner* — Craig Schneider
*Assistant Examiner* — Craig J Price
(74) *Attorney, Agent, or Firm* — Lerner, David, Littenberg, Krumholz & Mentlik, LLP

(57) ABSTRACT

A vane inlet apparatus is provided for separating components of a feed stream. The apparatus includes a body having an axis, a proximal end, and a distal end. The body includes an inlet and a plurality of vanes disposed along the axis. Each vane includes an aperture such that the apertures in successive vanes decrease in size toward the distal end of the apparatus. The vanes may be flat or curved. The sizes, shaped, and orientation of the vanes along the apparatus may be determined according to the designed specifications of a particular project. The apparatus as well as the vanes and apertures are preferably cylindrically shaped to match the incoming feed stream cross-section. A method of constructing the vane inlet apparatus is also provided.

27 Claims, 14 Drawing Sheets

VANE INLET DEVICE

BACKGROUND OF THE INVENTION

The present invention is directed to a vane inlet apparatus, and more particularly, to a cylindrically-shaped vane inlet apparatus for more efficiently separating the components of a feed stream.

Devices are used in industry to separate a feed stream into its components, which often include at least liquid and gas. Such devices are typically used in large tanks and are fed by cylindrical pipes through which a feed stream travels at an extremely high velocity. The device receives the feed stream and a plurality of vanes redirect the flow. As the feed stream enters the tank and is redirected by the vanes, the liquid tends to separate into droplets that settle into the tank while the gas rises above the liquid. While such devices and the processes for utilizing same are well known, they suffer from major inefficiencies due to the structure and design of the existing devices.

Current devices utilize two rows of vertically-oriented vanes, one row positioned along each side of the chamber to redirect flow from the chamber toward each side of the device. Thus, while the pipes and the inlets of the devices are circular in cross-section, the chambers are typically rectangular in cross-sections with vanes that have substantially vertical leading edges. As the flow of the feed stream is circular in cross-section, the vertically-oriented vanes are unevenly contacted by the feed stream along the length of the device. The vanes nearer to the inlet of the device slice off smaller portions of the feed stream than do the vanes further from the inlet. Moreover, the four corners of a rectangular cross-section of the chamber would receive little to none of the feed stream. As a result, the more distal vanes along the direction of flow bear the brunt of the feed stream and tend to distribute the incoming fluids less uniformly. This all contributes to an inefficient use of the device, resulting in less efficient separation of the components of the feed stream. Moreover, the large cross section of the existing devices blocks off a substantial portion of the tank area, causing higher pressure drop and locally higher turbulence, which decreases the effectiveness of the device.

Existing devices are also very cumbersome to manufacture and assemble. The nature of the vanes and their positioning in the chamber requires a large number components and small parts such as bolts and washers to secure the vanes within the device. Moreover, the rectangular design of the devices requires that they be assembled from within the tank, process vessel, or column in which they are to be used. This requires one or more workers to risk injury by entering the process vessel during assembly. In addition, existing devices are difficult to retrofit into existing older process vessels, because either internal weld attachments must be added, affecting ASME Section VIII Pressure Vessel Code integrity, or a complex system of expanding, clamping rings and/or struts must be fitted and installed, the purpose of such weld attachments and clamping devices is to support the prior art device(s) inside the vessel.

Therefore, a need exists for a vane inlet device that separates the components of a feed stream more efficiently and that is more economical and simpler to manufacture, assemble, and install through the cylindrical inlet opening of the vessel.

BRIEF SUMMARY OF THE INVENTION

A first aspect of the present invention is a vane inlet apparatus for separating components of a feed stream including a body defining an axis and having a proximal end and a distal end. The body includes of an inlet and a plurality of vanes disposed along the axis. Each of the plurality of vanes defines an aperture and a periphery, with the aperture of at least one vane being decreased in size relative to at least one more proximal vane.

In accordance with certain embodiments of this first aspect, the plurality of vanes may include a plurality of pairs of successive inlet vanes, wherein the aperture of the more distal vane of each pair is decreased in size relative to the aperture of the more proximal vane of the pair. The area of each successive aperture when projected onto a plane perpendicular to the axis may decrease at a constant or geometrically proportional rate toward the distal end. The apertures of the plurality of vanes may be substantially concentric about the axis. The plurality of vanes may be substantially evenly spaced along the axis. The aperture of the distal-most vane may have a radius of zero. The apparatus may include a solid end vane disposed distally of the plurality of vanes, wherein the end vane does not include an aperture. The body may be cylindrically-shaped. The periphery of each of the plurality of vanes may be continuously curved. Each of the plurality of vanes may be an elliptically-shaped annulus shaped to form a circular annulus when viewed from the direction of the inlet. The apparatus may further include a first support and a second support each connected to the inlet and the periphery of the plurality of vanes. The apparatus may further include a stabilization rod extending through the plurality of vanes for maintaining the spacing between the plurality of vanes. Each of the plurality of vanes may include an apex and at least one pair of planar surfaces disposed on opposing sides of the apex, each planar surface forming an angle with the axis. Each of the at least one pair of planar surfaces may include planar surfaces that form equal yet opposite angles with the axis. Each adjacent planar surface on one side of the apex may be tangential to a curve. The apexes of the plurality of vanes may be aligned substantially parallel to the axis. The apex of each of the plurality of vanes may be aligned in a substantially linear manner. The plurality of vanes may each include an apex and opposing curved surfaces that are joined at the apex. The opposing curved surfaces may comprise segmented flat portions.

A second aspect of the present invention is a vane inlet apparatus for separating components of a feed stream including a cylindrically-shaped body and first and second supports, the body defining an axis and having a proximal end and a distal end, the body comprised of an inlet and a plurality of vanes disposed along the axis, each of the plurality of vanes defining an aperture and a periphery, the aperture of at least one vane being decreased in size relative to at least one more proximal vane, the aperture of the distal-most vane having a radius of zero, and the first and second supports each connected to the inlet and the periphery of the plurality of vanes.

In accordance with certain embodiments of this second aspect, the area of each successive aperture when projected onto a plane perpendicular to the axis may decrease at a constant rate toward the distal end, the apertures of the plurality of vanes may be substantially concentric about the axis, and the plurality of vanes may be substantially evenly spaced along the axis.

A third aspect of the present invention is a method of making a vane inlet apparatus including the steps of forming a plurality of substantially flat vanes, forming an aperture in at least one of the plurality of vanes, forming a substantially flat end vane, bending each of the plurality of vanes and the end vane to form an apex and two opposing surfaces joined at the apex, providing an annular inlet, and aligning the inlet, each of the plurality of vanes, and the end vane along an axis.

In accordance with certain embodiments of this third aspect, the step of forming a plurality of substantially flat vanes may include forming a plurality of elliptically-shaped substantially flat vanes. The step of forming an aperture may include forming an elliptically-shaped aperture. The step of forming a substantially flat end vane may include forming a substantially flat elliptically-shaped end vane. The step of bending may cause a profile of each vane to be substantially V-shaped, such that a projection of the flat surface of each bent vane when viewed along the center axis defines a substantially circular outer periphery and a substantially circular aperture. The method may further include the step of attaching a first support and a second support to the periphery of each of the plurality of vanes, the end vane, and the inlet. The step of aligning may include substantially evenly spacing the vanes along the first and second supports. The step of forming an aperture in each of the plurality of vanes may include forming differently-sized apertures among at least two of the vanes. The step of aligning may include arranging the vane with the smaller aperture distally from the vane with the larger aperture.

DETAILED DESCRIPTION

Figure 1:
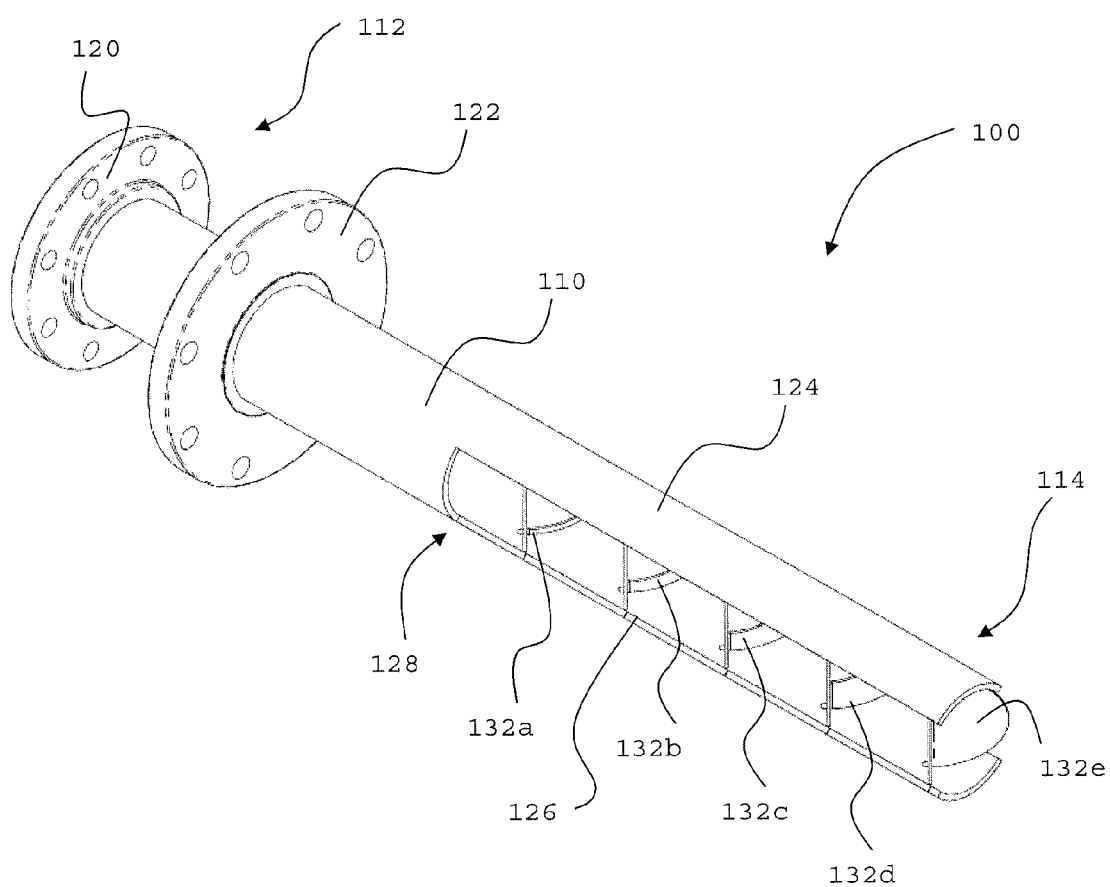
FIG. 1 is a top perspective view of a vane inlet apparatus in accordance with a first embodiment of the present invention.

A first embodiment of the present invention is depicted in FIGS. 1-5 as a vane inlet apparatus 100. Apparatus 100 includes a pipe 110, a first flange 120, a second flange 122, and a plurality of vanes 132a-e housed within pipe 110. Pipe 110 is a body that is preferably cylindrically-shaped about an axis 134, shown in FIG. 3, and includes a proximal end 112 and a distal end 114. An inlet 116 is disposed at proximal end 112, which is configured to couple with external components, such as tubes, pipes, vessels, etc., that carry a feed stream to apparatus 100. Such a feed stream is typically comprised of liquids, gasses, and/or solid materials that are to be separated from one another by apparatus 100.

Proximal end 112 of pipe 110 is constructed as a cylindrical tube being open at each end. Distal end 114 of pipe 110 extends from proximal end 112 and is constructed as a top strut 124 and a bottom strut 126, with a first opening 128 and a second opening 130 being defined therebetween. Top and bottom struts 124, 126 are shaped as portions of a cylindrical tube and act as supports for vanes 132a-e. Distal end 114 of pipe 110 and vanes 132a-e are securely connected together, preferably through welding.

Figure 2:
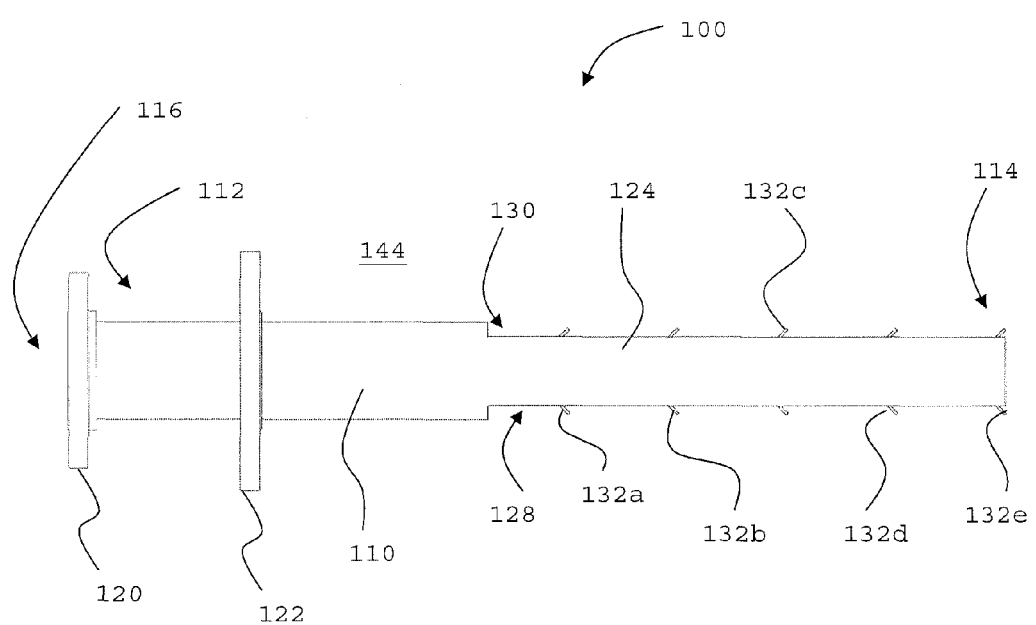
FIG. 2 is a top view of the apparatus shown in FIG. 1, the bottom view being a mirror image thereof.
Figure 3:
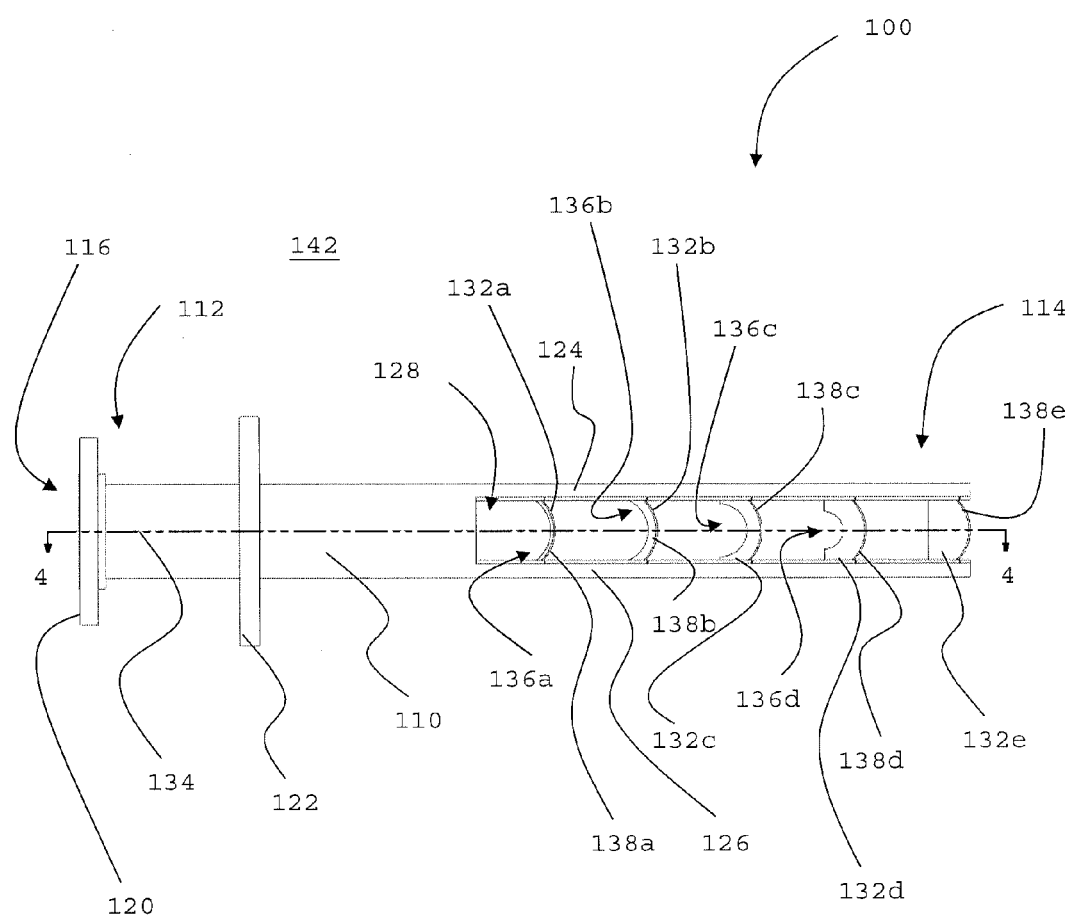
FIG. 3 is a side view of the apparatus shown in FIG. 1, the opposing side view being a mirror image thereof.
Figure 4:
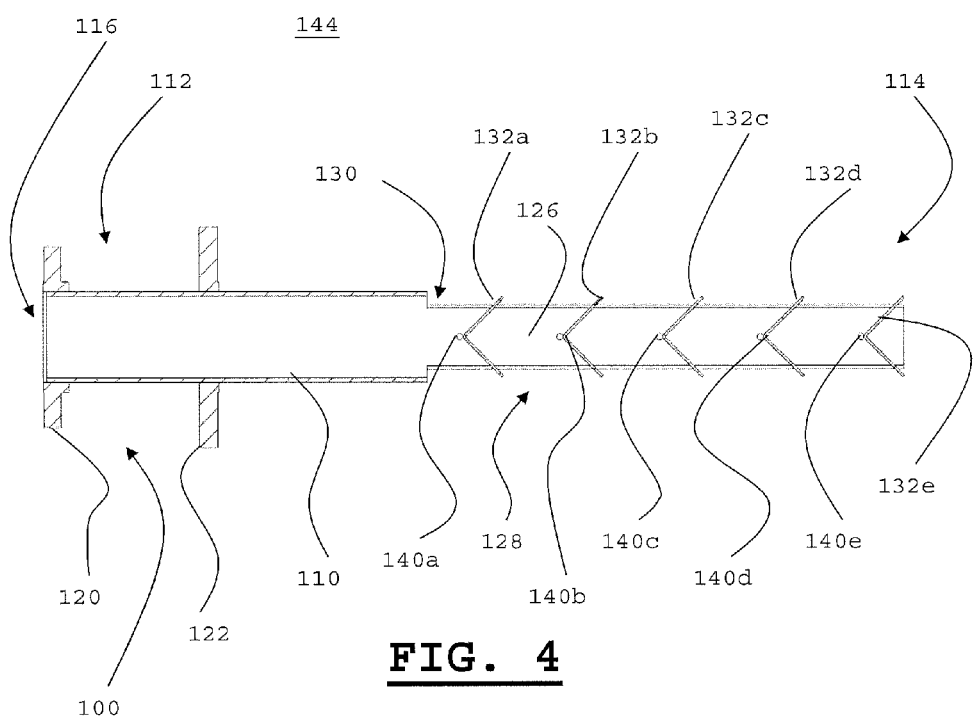
FIG. 4 is a top sectional view of the apparatus shown in FIG. 1 taken along the line A-A of FIG. 3.

As shown in FIGS. 1-4, apparatus 100 is preferably symmetrical with respect to a vertical plane 142 containing axis 134. FIG. 3 depicts a side view of apparatus 100 and is essentially a projection of apparatus 100 on vertical plane 142, which bisects top and bottom struts 124, 126. Thus, first and second openings 128, 130 are mirror images of one another with respect to vertical plane 142, and as shown in FIG. 3, appear rectangular in shape. Pipe 110 is also symmetrical with respect to a horizontal plane 144, which also contains axis 134 and is perpendicular to vertical plane 142. FIGS. 2 and 4 depict a top view and a top sectional view, respectively, of apparatus 100 and are essentially projections of apparatus 100 on horizontal plane 144.

Vanes 132a-e are disposed between top and bottom struts 124, 126 at distal end 114 of pipe 110. Vanes 132a-e are preferably configured to possess the above-described symmetrical properties in accordance with the depicted embodiment, and are generally disposed along axis 134. Each vane 132a-e includes a respective periphery 138a-e that is preferably continuously curved. Such continuous curvature includes both constant curvature and curvature resulting from a circle or ellipse comprised of short segments. That is, when viewed from a direction along axis 134, each periphery 138a-e is preferably circular, oval-shaped, or otherwise continuously curved. All but the distal-most vane 132e includes a respective aperture 136a-d. Vanes 132a-e are preferably spaced evenly along axis 134 and are exposed toward first and second openings 128, 130. Thus, vanes 132a-e are configured such that as the feed stream enters apparatus 100 from inlet 116 of pipe 110, it contacts vanes 132a-e in their respective order and is redistributed through first and second openings 128, 130.

Figure 5:
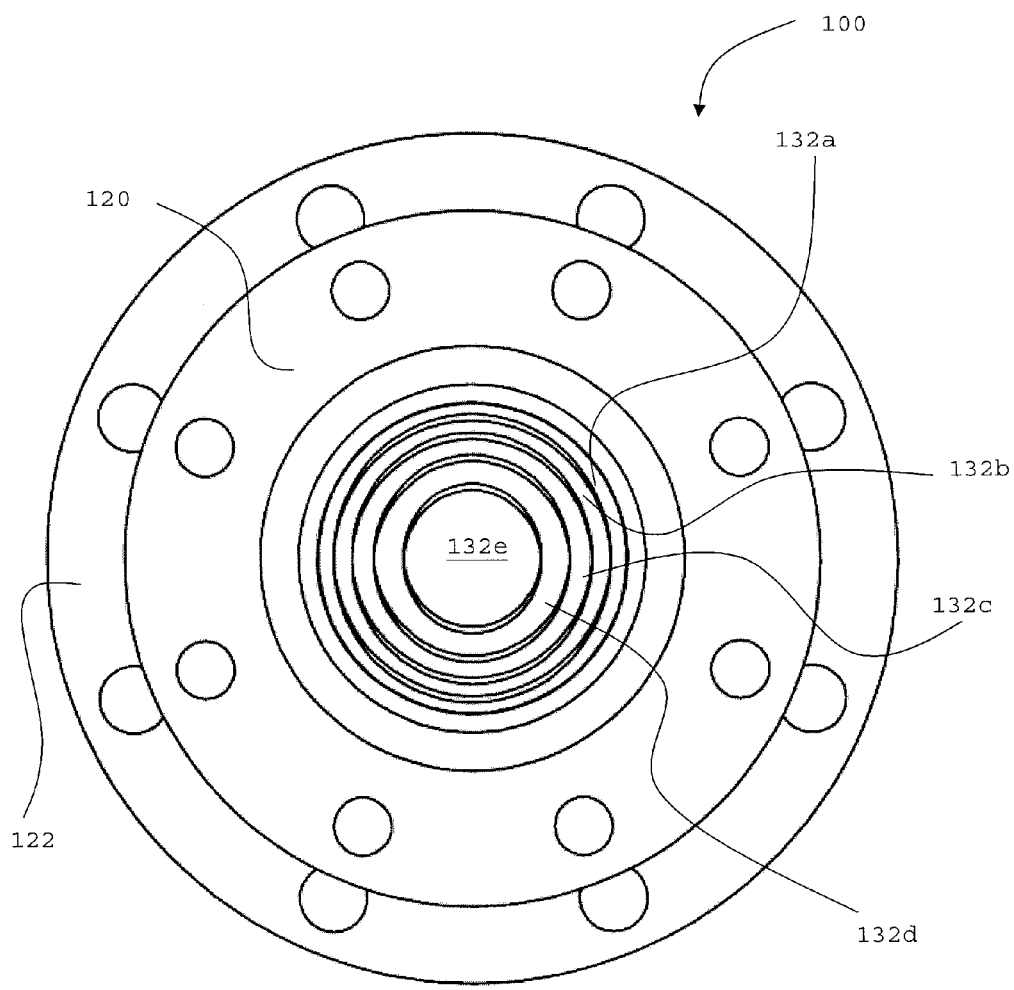
FIG. 5 is an end view of the apparatus shown in FIG. 1.

As shown in FIG. 3, each successive aperture 136a-d, respectively, decreases in size in a direction along axis 134 from proximal end 112 to distal end 114. This decrease is preferred so that a portion of a more distal vane will be exposed to the feed stream after it passes through the larger aperture of a more proximal vane. From the direction feed stream travels along axis 134, apertures 136a-d preferably appear as concentric circles, as depicted in FIG. 5. One or more successive apertures 136a-d may decrease in size at a constant or geometrically proportionate rate based on radius or area. Preferably, the area of each successive aperture is decreased by a percentage such that the feed stream is separated into even portions taking into account the total number of vanes. Of course the distal-most vane is preferably incorporated into the overall design and is considered to be solid with an aperture of zero radius.

First and second flanges 120, 122 extend radially outward from pipe 110 at or near proximal end 112. First and second flanges 120, 122 may include equal or different outer diameters with either of flanges 120, 122 being larger than the other, and are be dimensioned and constructed to correspond to the aforementioned external components. In the first embodiment depicted in FIGS. 1-5, second flange 122 is constructed to attach to an aperture in a vessel to allow for a secure attachment between apparatus 100 and the vessel. Distal end 114 of apparatus 100 extends within the vessel, while proximal end 112 extends outside the vessel such that first flange 120 may be attached to a pipe or other component that carries the feed stream. Of course, the particular size and construction of flanges 120, 122 can be set according to the external components with which they are to be connected. Thus, apparatus 100 may be designed to retrofit to existing technology.

Existing inlet apparatuses are typically fitted to existing components from within the tank to which the apparatus is attached. Thus, the acts of installing, removing, or maintaining the apparatuses are cumbersome. Apparatuses according to the present invention are designed to be inserted into the tank from its exterior. Separate flanges, such as flanges 120, 122, make it possible to attach the apparatus to the tank or vessel and separately connect external piping components. The distance between flanges 120, 122 may be any appropriate dimension according to the specific need and design, e.g. for bolting clearance. Such a configuration is typical for smaller apparatuses, while larger apparatuses according to the present invention may include a smaller dimension between flanges 120, 122, which may be in the form of a rigid ring and two gaskets, one on either face of said ring, which may also be compressed between the flange connected to the vessel to ensure a properly sealed connection.

Figure 6:
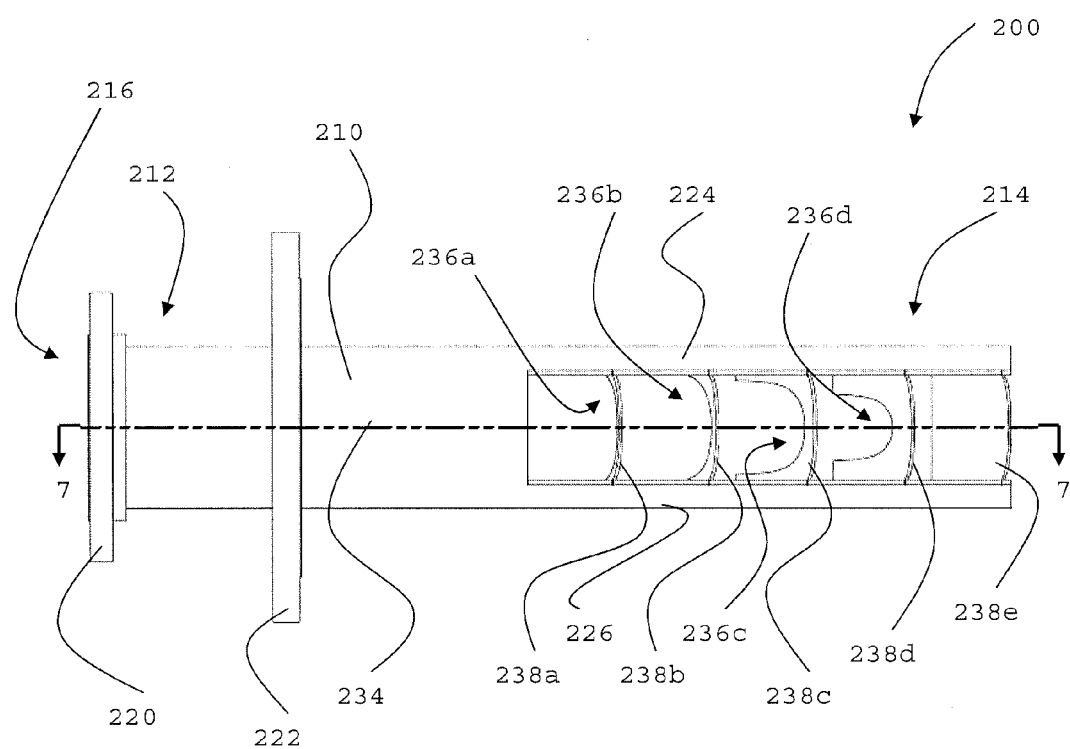
FIG. 6 is a side view of a vane inlet apparatus in accordance with a second embodiment of the present invention, the opposing side view being a mirror image thereof.
Figure 7:
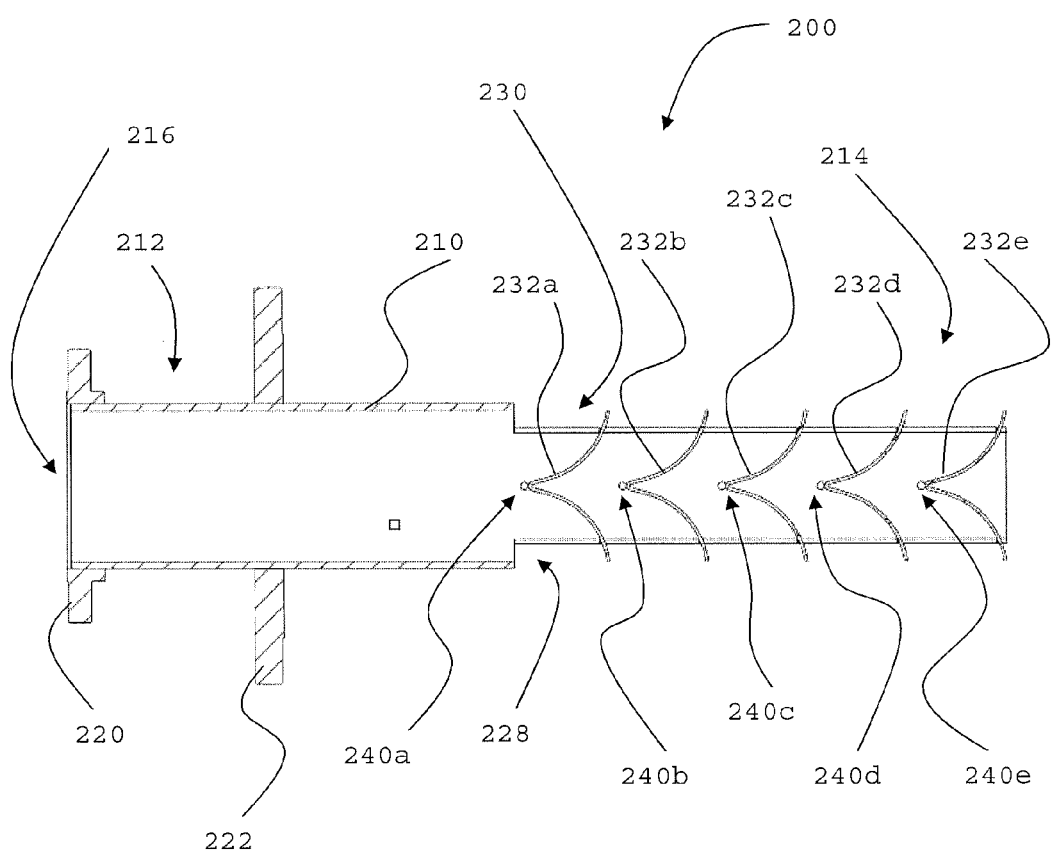
FIG. 7 is a top sectional view of the apparatus shown in FIG. 6 taken along the line A-A of FIG. 6.

A second embodiment of the present invention is depicted in FIGS. 6 and 7 as a vane inlet apparatus 200, which is similar in nature to the above-described embodiment. Apparatus 200 includes a pipe 210, a first flange 220, a second flange 222, and a plurality of vanes 232a-e housed within pipe 210. Pipe 210 is a body that is preferably cylindrically-shaped about an axis 234, shown in FIG. 6, and includes a proximal end 212 and a distal end 214. Distal end 214 of pipe 210 extends from proximal end 212 and is constructed as a top strut 224 and a bottom strut 226, with a first opening 228 and a second opening 230 being defined therebetween. An inlet 216 is disposed at proximal end 212, which is configured to couple with external components.

Apparatus 200 differs from apparatus 100 in the size and proportion of its elements, and because vanes 232a-e are continuously curved, as shown more clearly in FIG. 7. Curved vanes 232a-e allow for a different interaction between vanes 232a-e and the feed stream than the above-described embodiment, which may affect the distribution of the particles of the feed stream after their contact with one of vanes 232a-e. Each vane 232a-e includes a periphery 238a-e and an apex 240a-e in accordance with the above-disclosure. All vanes 232a-d but distal vane 232e include an aperture 236a-d.

Figure 8:
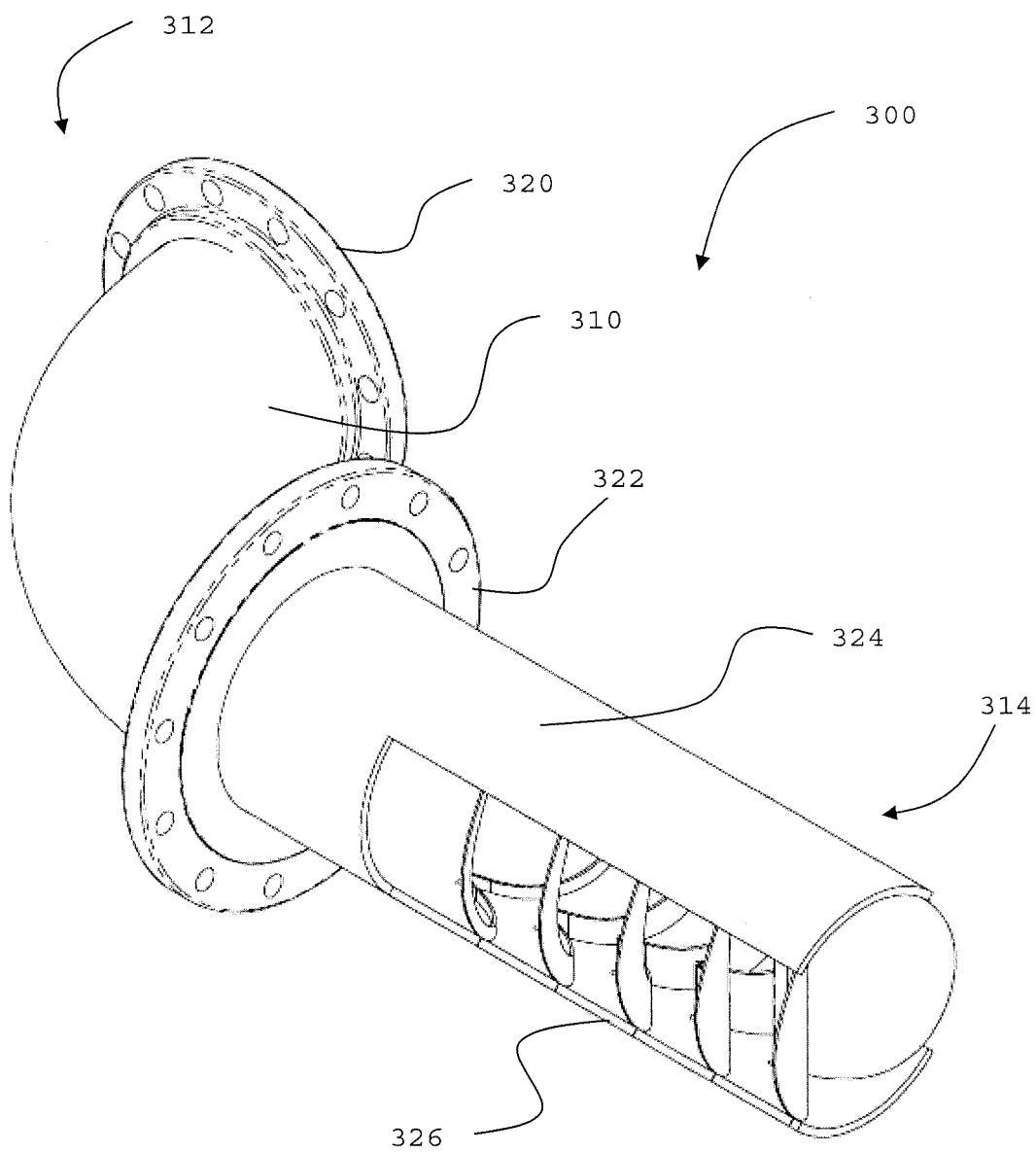
FIG. 8 is a top perspective view of a vane inlet apparatus in accordance with a third embodiment of the present invention.
Figure 9:
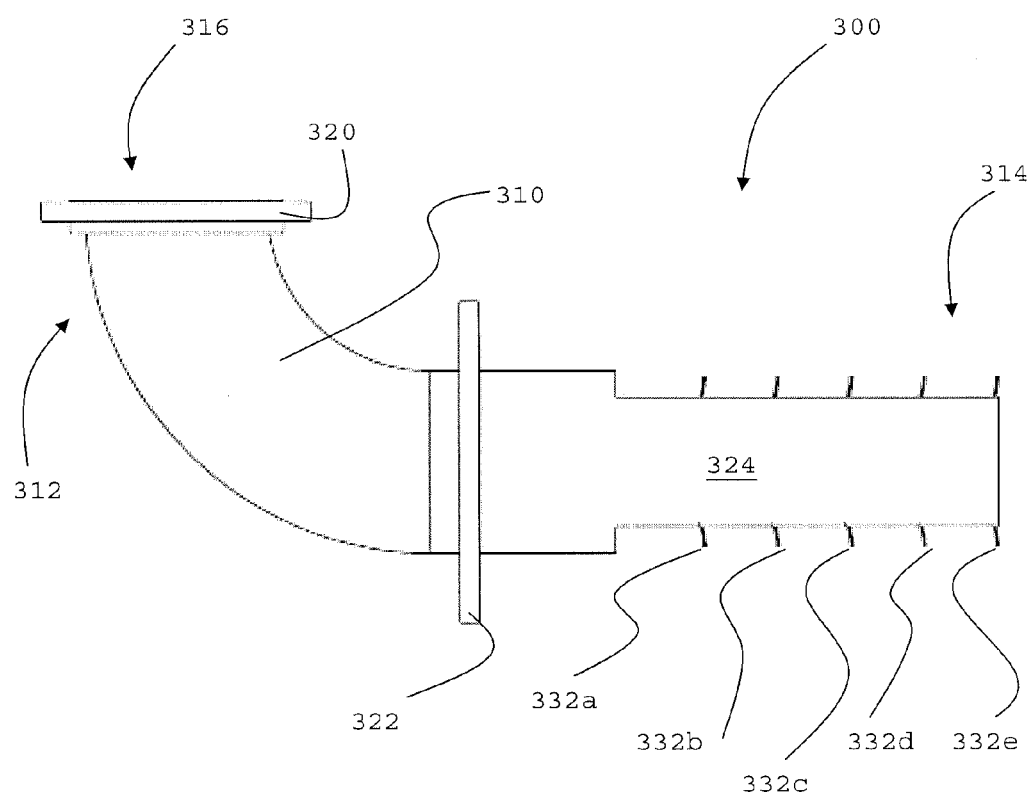
FIG. 9 is a top view of the apparatus shown in FIG. 8, the bottom view being a mirror image thereof.
Figure 10:
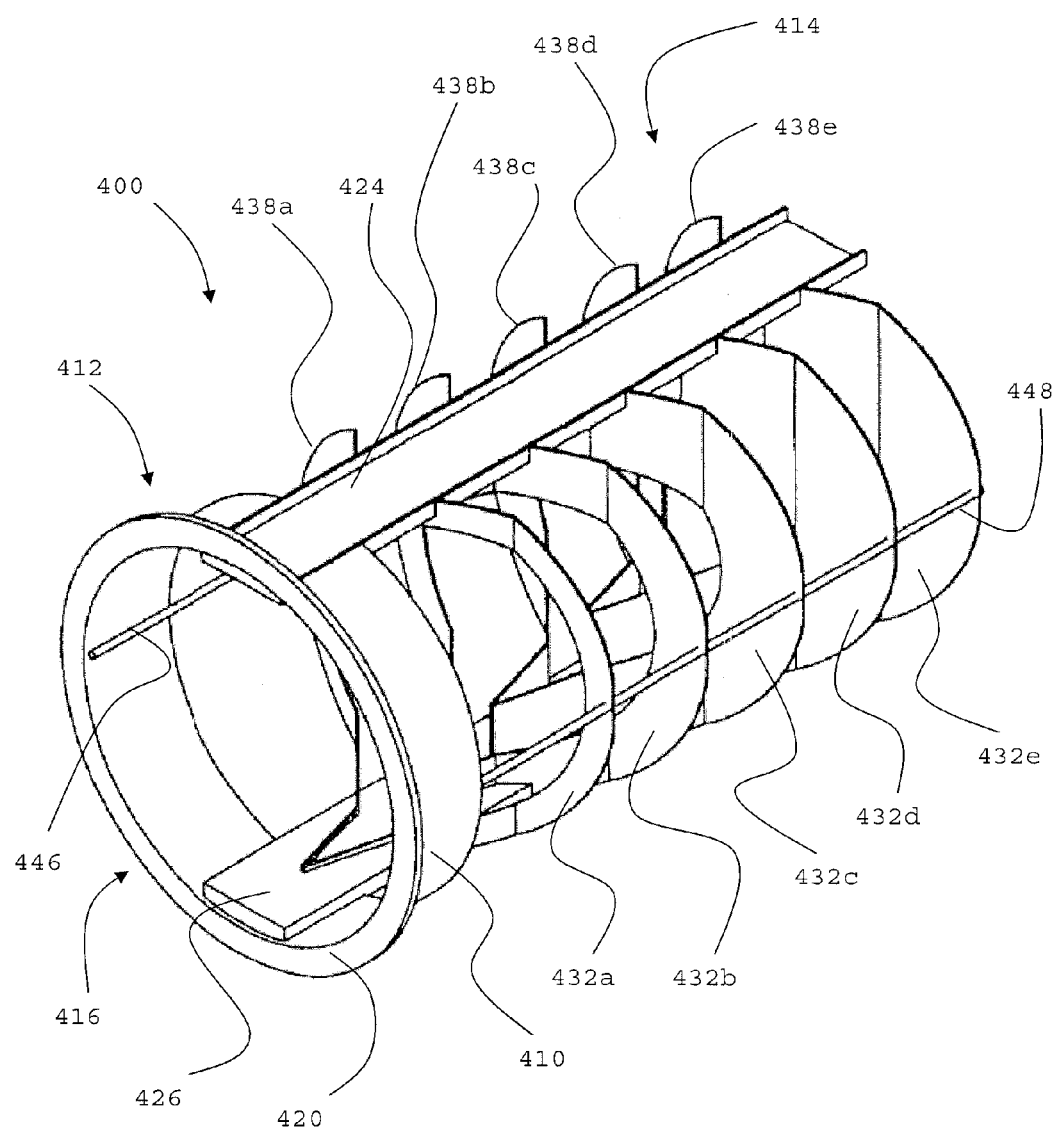
FIG. 10 is a top perspective view of a vane inlet apparatus in accordance with a fourth embodiment of the present invention.
Figure 11:
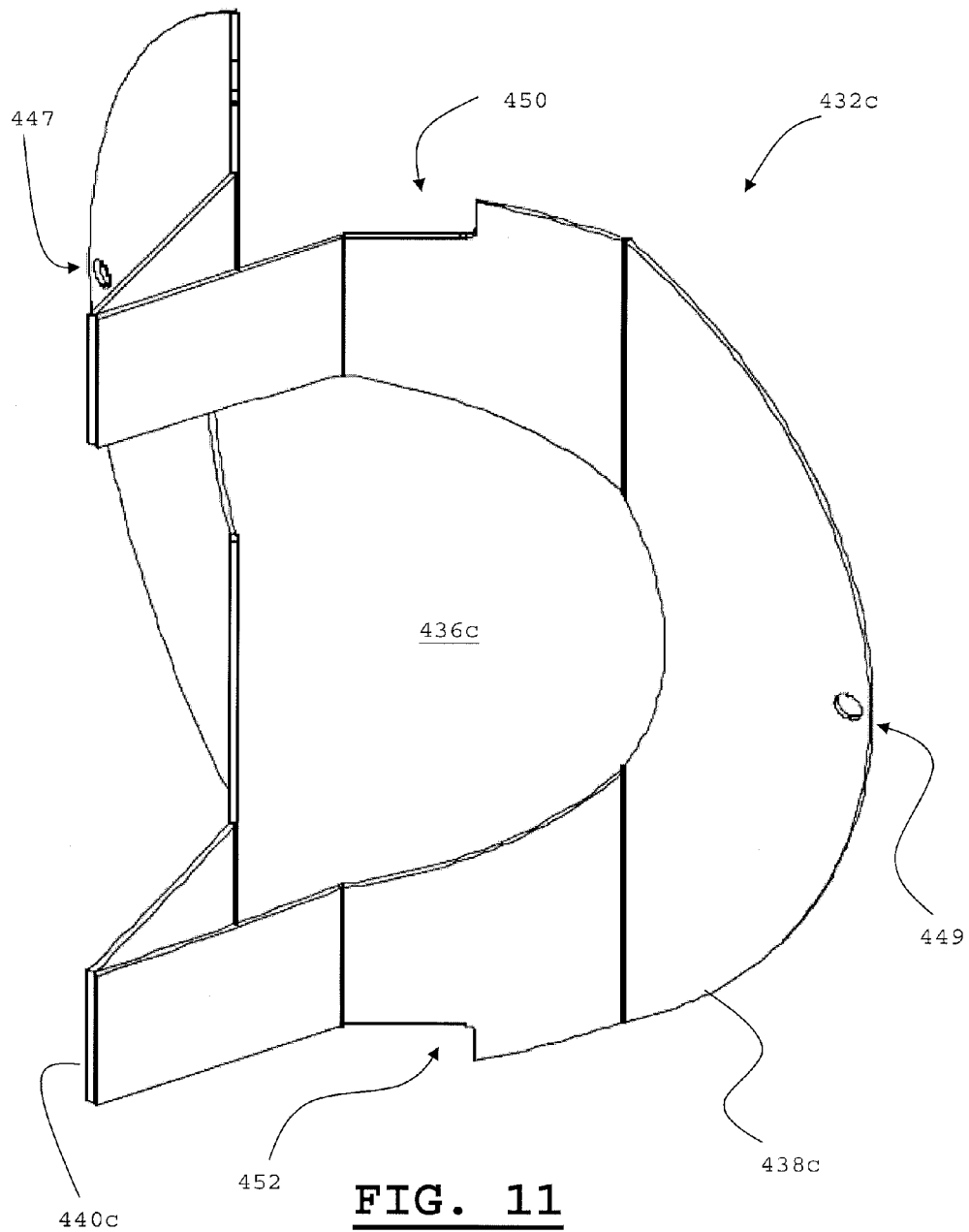
FIG. 11 is a top perspective view of a vane of the apparatus shown in FIG. 10.

A third embodiment of the present invention is depicted in FIGS. 8 and 9 as a vane inlet apparatus 300, which is similar in nature to the above-described embodiments.

Apparatus 300 includes a pipe 310, a first flange 320, a second flange 322, and a plurality of vanes 332a-e housed within pipe 310. Pipe 310 includes a curved proximal end 312 and a straight distal end 314. The curved proximal end 312, as shown or in some variation at a different curve radius and/or angle, may be needed at times to adapt to the geometry of external connecting piping. Distal end 314 of pipe 310 extends from proximal end 312 and is constructed as a top strut 324 and a bottom strut 326. An inlet 316 is disposed at proximal end 312 of pipe 310 and is configured to couple with external components.

Apparatus 300 differs from the above-described embodiments in the size and proportion of its elements, and because proximal end 312 is a curved, cylindrically-shaped pipe that takes on the form of an elbow. As shown in FIGS. 8 and 9, first flange 320 is disposed in a plane that is perpendicular to a plane containing second flange 322. Thus, proximal end 312 of pipe 310 continues along a 90-degree turn. Further, proximal end 312 of pipe 310 is preferably constructed to be disposed about a curved centerline that lies on a circle. As such, a feed stream entering inlet 316 will be redirected about a consistently angled path so that the velocity and particle distribution of the feed stream in a cross-section at the location of first flange 320 is substantially similar to the velocity and particle distribution at the location of second flange 322. Of course, the angle along which proximal end 312 extends may be any angle from 0-degrees (as in apparatuses 100, 200) to 90-degrees or greater depending on need.

A fourth embodiment of the present invention is depicted in FIGS. 10-14 as a vane inlet apparatus 400, which includes a pipe 410, a flange-insert ring 420, and a plurality of vanes 432a-e housed within pipe 410. A proximal end 412 of pipe 410 is much shorter relative to the above-described embodiments. A distal end 414 of pipe 410 extends from proximal end 412 and is essentially comprised of a top strut 424 and a bottom strut 426, each of which is substantially planar and/or formed as a structural channel. An inlet 416 is disposed at proximal end 412 of pipe 410 and is configured to couple with external components. The flange-insert ring 420 is designed to be sandwiched between the tank flange and the mating piping flange, with a gasket on either side of the ring 420 for sealing. This design may be used to reduce the overall weight and cost of the vane inlet device, and/or it may be used when the inlet device is retrofit into existing installations, to minimize rework of existing piping.

Top and bottom struts 424, 426 are smaller relative to their counterparts in the above-described embodiments. As a greater portion of each of vanes 432a-e is unattached to top and bottom struts 424, 426, stabilization rods 446, 448 (or structural members of a cross-section other than round) are attached to proximal end 412 and vanes 432a-e adjacent a periphery 438a-e of each vane 432a-e. Stabilization rods 446, 448 act as additional supports to maintain the orientation and spacing between vane 432a-e. Stabilization rods 446, 448 are preferably disposed at opposite sides of apparatus 400 to provide an even distribution of support to vanes 432a-e. Rods such as 446, 448 may be included on either or both sides of pipe 418, may be one or multiple rods on either or both sides, and may extend through and be welded to portions of each vane 432a-e or be connected tangentially at the respective periphery 438a-e of each vane 432a-e. Such rods provide additional support in larger apparatuses and apparatuses designed to encounter a higher-velocity or denser feed stream. Thicker vanes may also require stabilizer rods.

Figure 12:
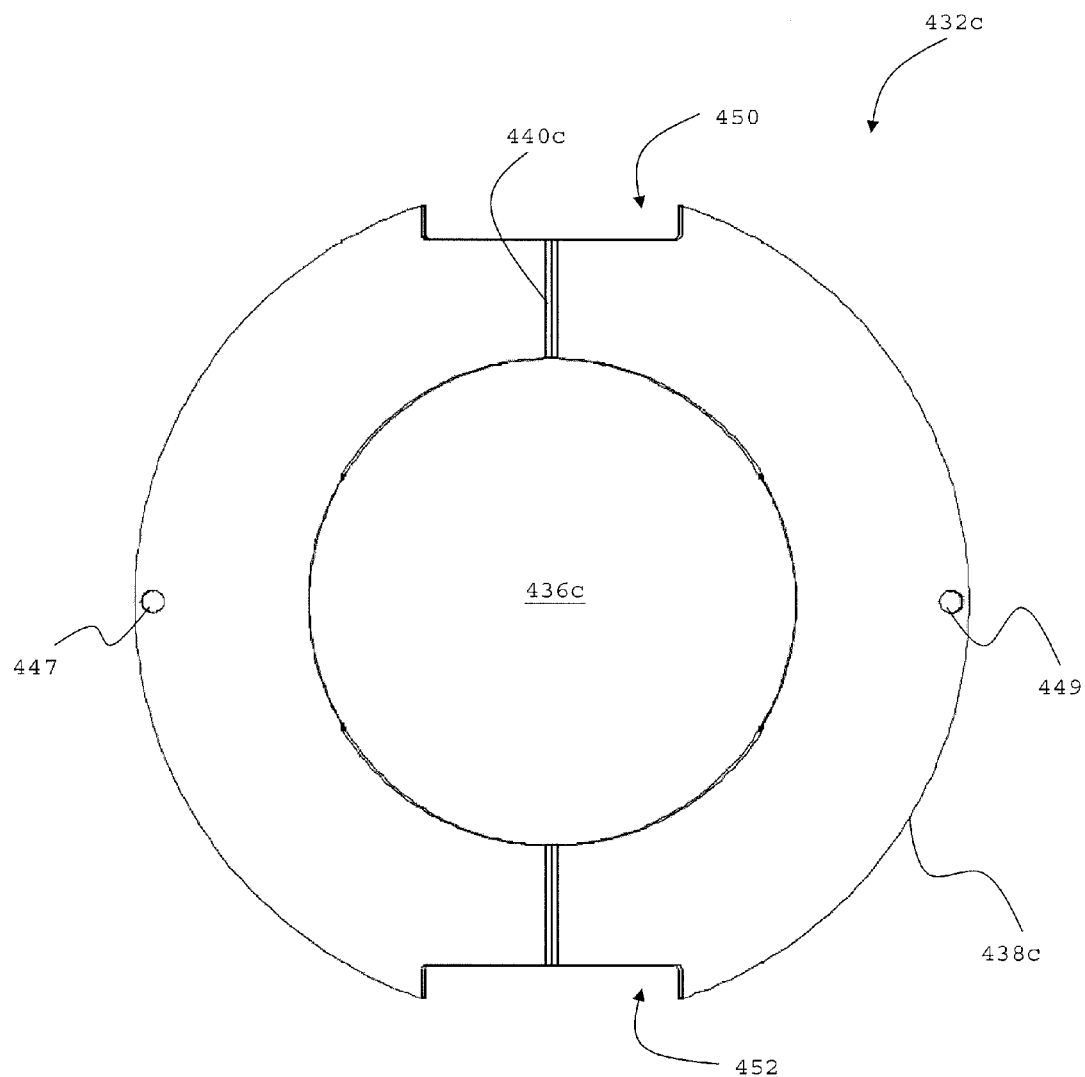
FIG. 12 is an end view of the vane shown in FIG. 11.
Figure 13:
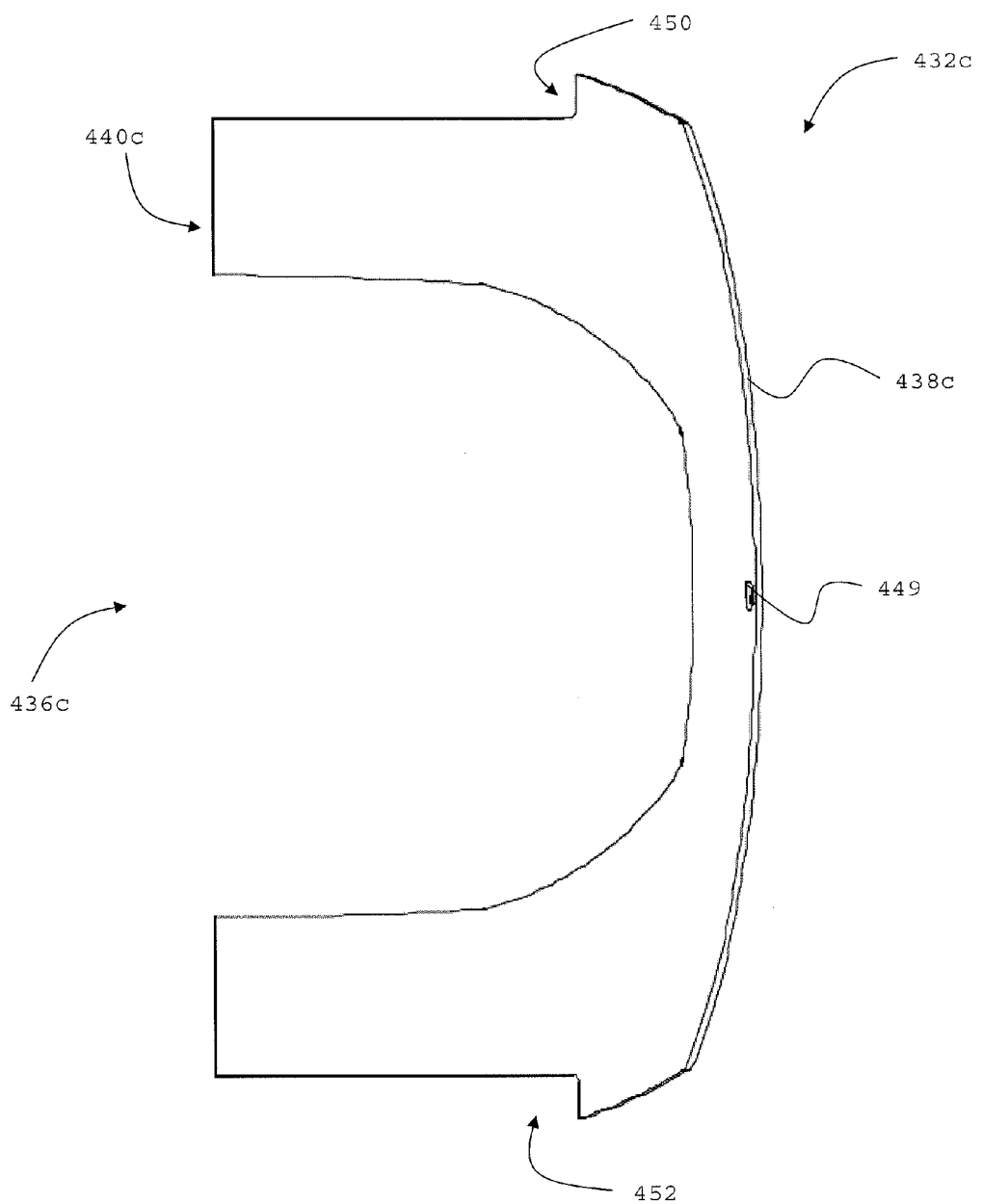
FIG. 13 is a side view of the vane shown in FIG. 11, the opposing side view being a mirror image thereof.
Figure 14:
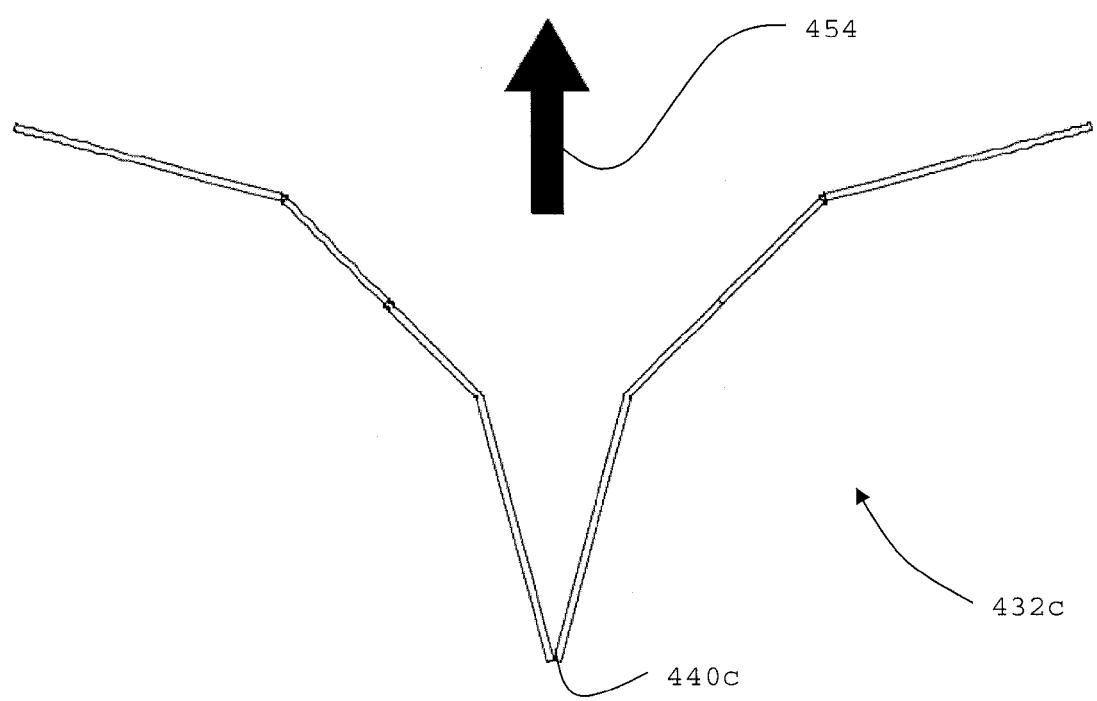
FIG. 14 is a top view of the vane shown in FIG. 11, the bottom view being a mirror image thereof.

Apparatus 400 also includes vanes 432a-e that are comprised planar segment that are angled with respect to one another and tangential to a curve. Segmented vanes 432a-e may be more easily manufactured than continuously-curved vanes, particularly in larger sizes, and function similarly to same. Any number of segments may be included to accurately approximate a curve. In FIGS. 11-14, vane 432c is shown separated from the remaining components of apparatus 400 and includes an aperture 436c, a periphery 438c, and an apex 440c. Openings 447, 449 are provided to connect stabilization rods 446, 448, respectively, with vane 432c. Periphery 438c includes recessed portions 450, 452 that attach to top and bottom struts 424, 426, respectively. Though recessed portions 450, 452, as shown in FIG. 12, form a portion of periphery 438c, any interruption of periphery 438c does not alter the overall continuous curvature of periphery 438c. In alternative embodiments, periphery 438c may not include recessed portions 450, 452 and top and bottom struts 424, 426 may directly attach to periphery 438c. An arrow 454 in FIG. 14 indicates the direction of flow of the feed stream during use of apparatus 400.

Vanes according to the present invention are configured and arranged to perform at least two particular functions, which will be described with respect to apparatus 100. First, as shown in FIG. 4, portions of vanes 132a-e are angled with respect to axis 134 to deflect portions of the feed stream from its incoming direction along axis 134 (shown, for example, by arrow 454 in FIG. 14) toward the exterior of pipe 110 through first and second openings 128, 130. More specifically, each vane 132a-e includes profile in horizontal plane 144 having an apex 140a-e, which apexes 140a-e may each be disposed along axis 134 or along an axis parallel to or angled with axis 134. Thus if more of the feed stream is desired to be projected toward a first side of pipe 118, the apexes of the vanes can be positioned closer to the opposite side of pipe 118 to allow a greater surface area of the vanes to direct particles of the feed stream toward the first side. When viewed from the top or bottom of pipe 110, as shown in FIG. 3, the lateral legs of each vane 132a-e are angled from axis 134 toward first and second openings 128, 130. According to the above-described embodiments, vanes of the present invention may be V-shaped (as in apparatus 100), curved (as in apparatuses 200 and 300, comprised of angled segments (as in apparatus 400), or otherwise configured to be angled between axis 134 and first and second openings 128, 130. In use, smaller apparatuses are fitted with curved vanes, while larger apparatuses include segmented or planar vanes. Such constructions are typical based on the size and ease of manufacture of the respective apparatuses. Opposing legs preferably form equal yet opposite angles or profiles along the axis containing their apexes, though other configurations are contemplated. In other embodiments, apexes 140a-e may not be aligned along any axis.

As a second function of vanes 132a-e, apertures 136a-d allow quantities of the feed stream to pass through each successive aperture 136a-d and contact the respective distally-positioned vanes 132b-e. This allows for the feed stream to be distributed through first and second openings 128, 130 in a predetermined manner along axis 134 based on the construction of apparatus 100. Each vane 132a-e then projects toward each side of pipe 110 and is thusly configured to redirect the denser liquid and/or solid particles of the feed stream that enter through inlet 116 while allowing the less dense vapors to disengage and flow out the openings between the vanes. That is, as feed stream encounters each of vanes 132a-e, a first portion of the feed stream contacts the first vane 132a while the remainder of the feed stream passes through aperture 136a. This continues as the feed stream contacts each successive vane 132b-e. Vane 132e preferably does not contain an aperture so that the final portion of the feed stream is diverted through openings 128, 130. A view of the successive portions vanes 132a-e as encountered by the feed stream is depicted in FIG. 5.

In the direction from the proximal end 112 to distal end 114 along axis 134, each successive aperture 136a-d is smaller in diameter. Although it can be seen that the diameter of each successive aperture does not decrease by a constant amount, it will be appreciated that due to the calculation of the area of each aperture when projected on a plain perpendicular to axis 134, the diameters of each successive aperture are preferably chosen to reflect a constant decrease in area for each successive aperture. In this manner, when the flow enters the inlet from a cylindrical tube, each vane will remove an equal portion of the flow and deflect same out of pipe 118. Each equal portion is taken as the exposed portion of each successive vane, which is effectively an annular ring when viewed in cross-section (shown, for example, in FIG. 12), until the final vane deflects the flow most proximate to central axis 134. The decrease in area of each aperture may be either constant or may also be variable. Thus, the sizing of the apertures allows for variation in construction to distribute more of the feed stream toward proximal end or distal end of the pipe, or to distribute the feed stream evenly along axis 134.

In accordance with the present invention, any number of vanes may be utilized in an apparatus to distribute a feed stream. It will be understood that the more vanes that are utilized in an apparatus, the more controlled the disbursement of particles in the feed stream.

As will be understood by the variations in design among the above-described embodiments, apparatuses according to the present invention are fully customizable according to their intended use. As such, an apparatus may be constructed to accurately and precisely fit existing vessels and pipes, or may be designed to integrate with new technology. The individual needs of a particular consumer or situation may therefore be met in any instance. For instance, vanes may be positioned and aligned such that more of the feed stream is distributed through either side or either end of an apparatus. Variable distributions are also contemplated. Parameters may be combined to create any conceivable distribution of the flow stream. Furthermore, apparatus 100 can be designed to operate effectively and efficiently under heavy spatial constraints that do not allow for full autonomy when constructing a system to utilize apparatus 100.

The materials used to construct a vane inlet apparatus according to the present invention are preferably metals that can withstand very high forces of impinging fluids without permanent mechanical deformation and/or rupturing. Such metals include, but are not limited to, various grades of steels, stainless steels, and higher metals/alloys of nickel, chromium, molibdenum, cobalt, vanadium, titanium, zirconoum, and tantallum. In highly corrosive environments, the vane inlet device or components thereof may also be fabricated from plastics, ceramics, carbon, and/or reinforced forms of these nonmetal materials. Different materials can be used to construct different portions of the apparatus as necessary. For instance a more durable material may be used to construct the vanes as the vanes will withstand the brunt of the force provided by the feed stream. In a similar manner, the proximal end of the pipe may be constructed of a different material than the distal end due to its potential curvature and need to redirect flow. The vanes are preferably welded to the pipe in a thorough and complete manner so as to prevent rupture of the weld joints.

An apparatus according to the present invention may be constructed in the following manner. A plurality of substantially flat vanes are prepared, and an aperture is formed in each vane as necessary taking into account that certain of the vanes will not include an aperture. Each vane is then bent into shape to form an apex and two opposing surfaces joined at the apex. It will be appreciated that while vanes in the above-described embodiments include circular apertures when viewed from a direction along a central axis of the vanes, each vane includes an outer periphery shaped as an oval or ellipse. Those vanes that include apertures are formed as elliptical annuluses, as each aperture also takes the form of an oval or ellipse. Of course, according to the particular specifications of the apparatus, the periphery and/or aperture of a vane may not be a perfect oval or ellipse, and may include segmented lengths if the vanes are to be segmented when finally formed. Vanes that include apertures are preferably bent into shape to form a substantially circular annulus when viewed along an axis of the vanes, if an even distribution of the feed stream is required.

An inlet is provided for the apparatus, and is preferably annular in form. The inlet, each of the bent vanes including an aperture, and the bent end vane without an aperture are then aligned according to the desired structure of the apparatus. First and second struts or supports are attached to the periphery of each of the plurality of vanes, and if provided as separate components, are attached to the inlet. Of course, differently-sized apertures are formed among the vanes, and the vanes are order to position the vane with the largest aperture closest to the inlet, with the vane having the next largest aperture adjacent the first vane, and so on.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vane inlet apparatus for separating components of a feed stream, the apparatus comprising:
   a body defining an axis and having a proximal end and a distal end, the body including an inlet and a plurality of vanes disposed along the axis;
   wherein each of the plurality of vanes defines an aperture and a periphery, the aperture of at least one vane being decreased in size relative to at least one more proximal vane, and
   wherein each of the plurality of vanes includes an apex and first and second surfaces respectively disposed on opposing sides of the apex, the apex of at least one of the plurality of vanes formed as two separate and distinct segments.

2. The apparatus of claim 1, wherein the plurality of vanes includes a plurality of pairs of successive vanes, wherein the aperture of the more distal vane of each pair is decreased in size relative to the aperture of the more proximal vane of the pair.

3. The apparatus of claim 2, wherein the area of each successive aperture when projected onto a plane perpendicular to the axis decreases at a constant rate toward the distal end.

4. The apparatus of claim 3, wherein the apertures of the plurality of vanes are substantially concentric about the axis.

5. The apparatus of claim 2, wherein the plurality of vanes are substantially evenly spaced along the axis.

6. The apparatus of claim 2, wherein the aperture of the distal-most vane has a radius of zero.

7. The apparatus of claim 1, wherein the body is cylindrically-shaped.

8. The apparatus of claim 7, wherein the periphery of each of the plurality of vanes is continuously curved.

9. The apparatus of claim 8, wherein each of the plurality of vanes is an elliptically-shaped annulus shaped to form a circular annulus when viewed from the direction of the inlet.

10. The apparatus of claim 1, further comprising a first support and a second support each connected to the inlet and the periphery of the plurality of vanes.

11. The apparatus of claim 10, further comprising a stabilization rod extending through the plurality of vanes for maintaining the spacing between the plurality of vanes.

12. The apparatus of claim 1, wherein the first and second surfaces include at least one pair of planar surfaces disposed on opposing sides of the apex, each planar surface forming an angle with the axis.

13. The apparatus of claim 12, wherein each of the at least one pair of planar surfaces includes planar surfaces that form equal yet opposite angles with the axis.

14. The apparatus of claim 12, wherein each adjacent planar surface on one side of the apex is tangential to a curve.

15. The apparatus of claim 1, wherein the apexes of the plurality of vanes are positioned along an axis that is substantially parallel to the axis defined by the body.

16. The apparatus of claim 1, wherein the apexes of the plurality of vanes are positioned along an axis.

17. The apparatus of claim 1, wherein the first and second surfaces are curved.

18. The apparatus of claim 17, wherein the curved first and second surfaces each comprise segmented flat portions.

19. A vane inlet apparatus for separating components of a feed stream, the apparatus comprising:
   a cylindrically-shaped body defining an axis and having a proximal end and a distal end, the body including an inlet and a plurality of vanes disposed along the axis, each of the plurality of vanes defining an aperture and a periphery, the aperture of at least one vane being decreased in size relative to at least one more proximal vane, each of the plurality of vanes including an apex and first and second surfaces respectively disposed on opposing sides of the apex, the apex of at least one of the plurality of vanes formed as two separate and distinct segments, the aperture of the distal-most vane having a radius of zero; and
   first and second supports each connected to the inlet and the periphery of the plurality of vanes.

20. The apparatus of claim 19, wherein the area of each successive aperture when projected onto a plane perpendicular to the axis decreases at a constant rate toward the distal end, the apertures of the plurality of vanes are substantially concentric about the axis, and the plurality of vanes are substantially evenly spaced along the axis.

21. A method of making a vane inlet apparatus comprising the steps of:
   forming a plurality of substantially flat vanes;
   forming an aperture in at least one of the plurality of vanes;
   forming a substantially flat end vane;
   bending each of the plurality of vanes and the end vane to form an apex and two opposing surfaces joined at the apex;
   providing an annular inlet; and
   aligning the inlet, each of the plurality of vanes, and the end vane along an axis.

22. The method of claim 21, wherein the step of forming the plurality of substantially flat vanes includes forming a plurality of elliptically-shaped substantially flat vanes, the step of forming the aperture includes forming an elliptically-shaped aperture, and the step of forming the substantially flat end vane includes forming a substantially flat elliptically-shaped end vane.

23. The method of claim 22, wherein the step of bending causes a profile of each vane to be substantially V-shaped, such that a projection of a flat surface of each bent vane defines a substantially circular outer periphery and a substantially circular aperture.

24. The method of claim 21, further comprising the step of attaching a first support and a second support to the periphery of each of the plurality of vanes, the end vane, and the inlet.

25. The method of claim 21, wherein the step of aligning includes substantially evenly spacing the vanes along the first and second supports.

26. The method of claim 21, wherein the step of forming the aperture includes forming differently-sized apertures among at least two of the vanes, and wherein the step of aligning includes arranging the vane with the smaller aperture distally from the vane with the larger aperture.

27. A vane inlet apparatus for separating components of a feed stream, the apparatus comprising:
- a body defining a first axis and having a proximal end and a distal end, the body including an inlet and a plurality of vanes disposed along the first axis;
- wherein each of the plurality of vanes defines an aperture and a periphery, the aperture of at least one vane being decreased in size relative to at least one more proximal vane, and
- wherein each of the plurality of vanes includes an apex defined entirely along a second axis and first and second surfaces respectively disposed on opposing sides of the apex.

* * * * *